(12) United States Patent
Ikai et al.

(10) Patent No.: US 6,421,162 B2
(45) Date of Patent: Jul. 16, 2002

(54) METHOD FOR PRODUCING A CELL FOR AN ELECTROCHROMIC MIRROR AND AN ELECTROCHROMIC MIRROR

(75) Inventors: Keizo Ikai; Tsuyoshi Asano; Masaaki Kobayashi; Yoshinori Nishikitani, all of Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/747,654

(22) Filed: Dec. 26, 2000

(30) Foreign Application Priority Data

Dec. 28, 1999 (JP) .............................. 11-373422

(51) Int. Cl.⁷ ............................ G02F 1/155; G02F 1/15
(52) U.S. Cl. ...................................... 359/266; 359/265
(58) Field of Search .................... 359/265, 267, 359/270, 272, 273, 274, 275, 266, 269, 271; 429/303, 309, 317, 331, 332; 438/62; 252/518.1; 333/204

(56) References Cited

U.S. PATENT DOCUMENTS

| | | | | |
|---|---|---|---|---|
| 5,066,111 A | * | 11/1991 | Singleton et al. ........... 359/275 |
| 5,516,704 A | * | 5/1996 | Yoshida ....................... 438/62 |
| 5,790,298 A | * | 8/1998 | Tonar ......................... 359/267 |
| 5,877,888 A | * | 3/1999 | Coleman ..................... 359/267 |
| 6,294,111 B1 | * | 9/2001 | Shacklett, III et al. .. 252/518.1 |
| 6,310,525 B1 | * | 10/2001 | Nakakubo et al. .......... 333/204 |

* cited by examiner

Primary Examiner—Georgia Epps
Assistant Examiner—Gary O'Neill
(74) Attorney, Agent, or Firm—Akin, Gump, Strauss, Hauer & Feld, L.L.P.

(57) ABSTRACT

A method for producing a cell for an electrochromic mirror by laminating two electrically conductive substrates which comprises the step of placing at least two plates each having at least one linear portion and provided with in a predetermined position with a punched-out portion having a shape corresponding to that of said substrate, such that each of said linear portions is located on the same line or on each of two lines offset from each other, in a juxtaposed relationship at a predetermined interval; the step of positioning said two substrates by inserting them into each of said punched-out portions; the step of shifting one of said plates holding said substrates therein over the other plate such that the substrates are located in a superposed relationship to each other; and the step of laminating said substrates.

8 Claims, 3 Drawing Sheets

METHOD FOR PRODUCING A CELL FOR AN ELECTROCHROMIC MIRROR AND AN ELECTROCHROMIC MIRROR

BACKGROUD OF THE INVENTION

1. Field of the Invention

This invention relates to a method for producing a cell for an electrochromic mirror which is capable of reversibly varying reflectance to electromagnetic radiation such as light.

2. Description of the Prior Art

Electrochromic mirrors have been used for glare-protection purposes from light emanating from the headlights of vehicles approaching from the rear by reversibly varying reflectance to electromagnetic radiation. Demand for such electrochromic mirrors has gone up sharply in recent years.

In general, an electrochromic mirror is formed by injecting an electrolyte and an electrochromic compound if necessary into a cell produced by sealing the periphery of a transparent electrically conductive substrate and a reflective electrically conductive superposed on each other.

In the production of such a cell, there may arise necessity to accurately position two electrically conductive substrates which may be hereinafter merely referred to as substrates, when they are superposed and then laminated. The lamination operation of such two substrates is also employed in the production of liquid crystal displays in a similar manner in which instance two substrates are positioned by registering the reference point of the substrate with that of the other through a monitor. This method is advantageous in terms of accuracy but is costly. There is a method which is less in accuracy but has been employed more frequently. In this method, pins are used to position substrates. This method is carried out by pushing substrates toward the pins fixed so as to determine the position of two substrates. This method is effective when using rectangular substrates having right-angled corners, such as substrates for liquid crystal displays but has a difficulty in positioning substrates having four corners with complex curved contours, such as mirrors for automobiles.

Therefore, an object of the present invention is to provide a method for producing an electrochromic mirror cell in which two substrates can be laminated with positioned accurately even though they are ones having complex contours and which is enhanced in productivity and is capable of producing a cell with less cost; and an electrochromic mirror produced using the cell.

SUMMARY OF THE INVENTION

According to the present invention, there is provided a method for producing a cell for an electrochromic mirror by laminating two electrically conductive substrates which comprises: a step of placing at least two plates each having a linear portion and provided with in a predetermined position with a punched-out portion having a shape corresponding to that of the substrate, in a juxtaposed relationship to each other at a predetermined interval, such that the linear portions are registered with the same line or two lines offset from each other, respectively; a step of inserting the two substrates into each of the punched-out portions; a step of shifting one of the plate holding the substrate therein over the other plate so as to locate the substrates in a superposed relationship to each other; and a step of laminating said substrates.

Furthermore, according to the present invention, there is provided with a method for producing a cell for an electrochromic mirror by laminating two electrically conductive substrates which comprises: a step of inserting one of the substrates into the punched-out portion having a shape corresponding thereto of a lower plate of a positioning device which further comprises an upper plate provided with a punched-out portion having the same shape as that of the punched-out portion of the lower plate, arranged in a superposed relationship to the lower plate so as to register the punched-out portions with each other or an upper plate provided with a punched-out portion which is larger by a predetermined offsetting width than the lower punched-out portion, arranged in a superposed relationship to the lower plate so as to register at least one side of one of the punched-out portions with that of the other plate; and a step of inserting the other substrate into the punched-out portion of the upper plate so as to be superposed on the lower substrates or a step of inserting the other substrate into the punched-out portion of the upper plate with one side of the other substrate abutting the offset side of the upper punched-out portion so as to be superposed on the lower substrate, offsetting therefrom at a predetermined width.

Still furthermore, according to the present invention there is provided with an electrochromic mirror obtained by inserting an electrolyte into a cell produced by the above-described method.

DETAILED DESCRIPTION OT THE INVENTION

Figure 1:
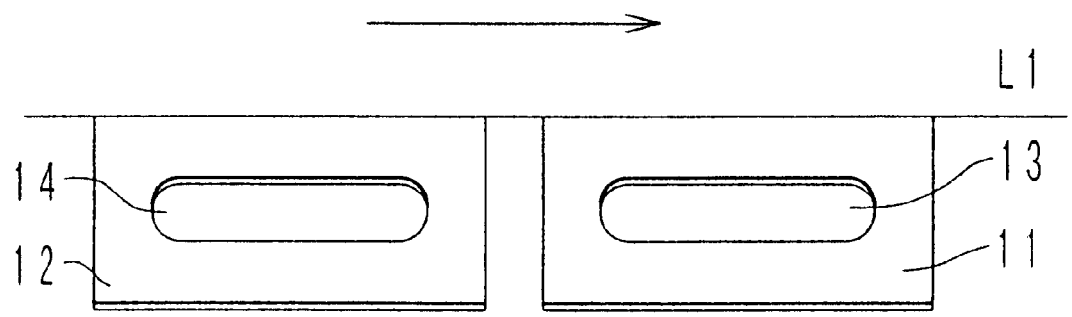
FIG. 1 shows two plates 11, 12 which are arranged such that their linear portions are in registered with the same line L1 in a juxtaposed relationship at a predetermined interval.

A method for producing an electrochromic mirror cell in accordance with the present invention is described in the order of the steps below.

Firstly, the electrically conductive substrates are described.

The term "electrically conductive substrates" used herein designates ones which act as electrodes. Therefore, the conductive substrate used in the present invention encompasses a substrate which itself is made from an electrically conductivity material, or a laminate formed by laminating an electrode layer on one or both of the surfaces of a nonelectrically conductive substrate. Regardless of whether a substrate has electrically conductive or not, it necessarily has a smooth surface at normal temperature but may have a flat or curved surface and may be deformable under stress. The substrates generally have the same shape but may have a different shape as well. Although not restricted, the thickness of the substrate is usually from 0.2 to 2.5 mm.

One of the two conductive substrates is transparent and the other is a reflective conductive substrate which can reflect electromagnetic waves, typically lights.

The term "transparent" used herein denotes an optical transmissivity of 10 to 100% in visible light region.

No particular limitations is imposed on the materials for such a transparent substrate. It may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate, and polystyrene.

Eligible materials for the transparent electrode layer may be a thin film of metal such as gold, silver, chrome, copper and tungsten or metal oxides such as ITO ($In_2O_3$-$SnO_2$), tin oxide, silver oxide, zinc oxide and vanadium oxide. The electrode layer has a film thickness in the range of usually 10 to 500 nm and preferably 50 to 300 nm. The surface resistance, i.e., resistance per unit area, of the electrode is usually in the range of 0.5 to 500 Ω/sq and preferably 1 to 50 Ω/sq. Any suitable known method for forming the electrode layer on the transparent substrate can be employed.

The reflective electrically conductive substrate may be exemplified by (1) a laminate comprising a non-conductive transparent or opaque substrate and a reflective electrode layer formed thereon, (2) a laminate comprising a non-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon, and (5) a plate-like substrate which itself functions as a reflective layer and an electrode.

The term "reflective electrode layer" used herein denotes a thin film which has a specular surface and is stable electrochemically. Such a thin film are the films of metal such as gold, platinum, tungsten, tantalum, rhenium, osmium, iridium, silver, nickel and palladium and the film of an alloy such as platinum-palladium, platinum-rhodium and stainless steel. Any suitable method may be used for the formation of the thin film having a specular surface, and thus vacuum deposition, ion-plating or sputtering is suitably selected. A substrate for the reflective conductive layer may or may not be transparent. Therefore, the substrate may be the above-exemplified transparent substrates, and various opaque plastics, glasses, woods, and stones as well. In the case where the above-described reflective electrode layer itself has rigidity, a substrate therefor may be omitted.

The above-mentioned reflective plate and reflective layer are substrates and thin films both of which have a specular surface. The plate and layer may be a plate or a thin film, formed from silver, chrome, aluminum, stainless steel, and nickel-chrome.

The substrate may have an electrochromic compound layer or a layer containing an electrochromic compound formed thereon.

The present invention is characterized in that the two substrates are laminated in the following procedures.

FIG. 1 shows two plates 11, 12 which are positioned such that the linear portions are in registered with the same line L1 and arranged in a juxtaposed relationship at a predetermined interval.

Figure 2:
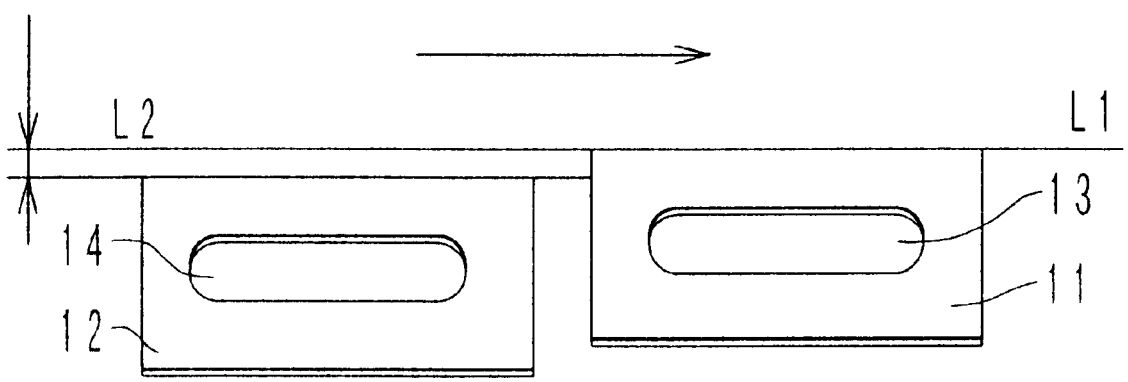
FIG. 2 shows two plates 11, 12 which are positioned such that each of the linear portions of the substrates is in registered with two lines L1, L2 extending with a predetermined offset width "a", respectively.

FIG. 2 shows two plates 11, 12 which are positioned such that each of the linear portions of the substrates is registered with two lines L1, L2 extending with a predetermined offset width "a", respectively.

Firstly, these plates are described. As shown in FIGS. 1 and 2, each of the plates 11, 12 has at least one linear portion and is provided with a punched-out portion 13, 12 formed so as to correspond to the shape of a substrate, in a predetermined position. Although the plates may be plastics- or metal- plates, preferred are metal ones when the accuracy of the substrate positioing is sought. The metal plate may be made of aluminum or stainless-steel, but the former is preferred. The plates has at least one linear portion. As long as they have a linear portion, they may take any shapes. For examples, they may be triangle, square, trapezium, semicircle, and ellipse in shape. Preferred shape is rectangular as shown in the drawings. The thickness of the plates is preferably equal to or slightly thinner than that of a substrate. The punched-out portion is provided in a predetermined portion of each of the plates. The position of the punched-out portion may vary depending on the shape of a substrate and the shape of the plate to be used. Since an electrochromic mirror is generally produced using two substrates having the same rectangular shape, more specifically entirely having a rectangular shape whose long and short sides are curved, it is advantageous for positioning the substrates that the longitudinal direction of the punched-out portion is in coincide with that of the plates. By "the substrate has a rectangular shape" is incorporated a rectangular shape having 4 corners having complex curved contours as well as a rectangular shape having 4 corners with complex curved contours and long and/or short sides which are straight or curved.

Figure 3:
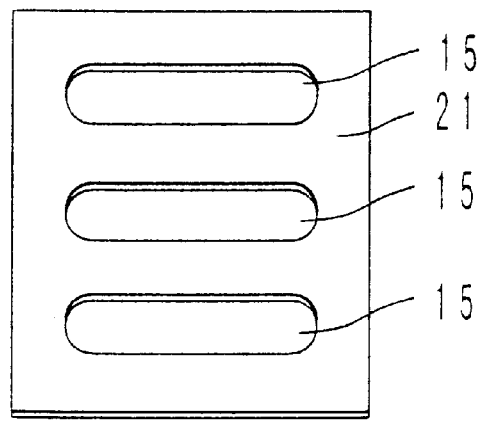
FIG. 3 shows a plate provided with 3 punched-out portions with a shape corresponding to that of an electrically conductive substrate.

As shown in FIG. 3, a plate 21 may be provided with a plurality of substrate shaped punched-out portions 15 such that a plurality of substrates are laminated in one operation. The number of punched-out portions is preferably from 2 to 100, more preferably from 2 to 50, and particularly preferably from 2 to 30, whereby the lamination operation is conducted effectively and thus is enhanced in productivity.

Figure 4:
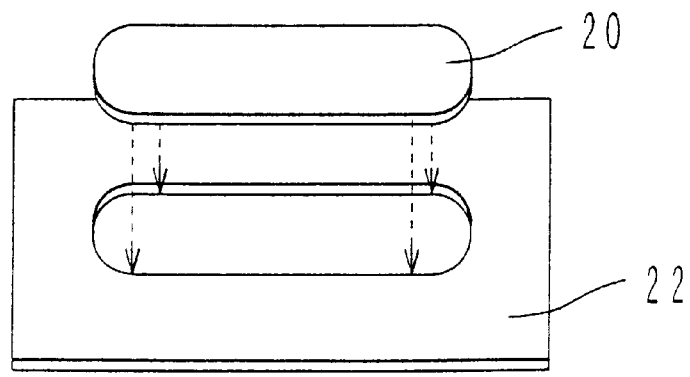
FIG. 4 is a schematic view showing that a substrate is inserted into the punched-out portion of a plate.

Two substrates may be laminated in the following manner. Firstly, a substrate which located on the upper side of the laminated substrates is inserted into the punched-out portion 13 of the plate 11. On the other hand, the other substrate is inserted into the punched-out portion 14. This substrate is applied on its peripheral edge with a sealant beforehand as described below. FIG. 4 shows how the substrate 20 is inserted into the punched-out portion of a plate 22. In the case of the plates shown in FIG. 1, the same shaped plates 11, 12 are placed with the linear portion registered with the same line L1 whereby the two substrates are positioned such that they can be brought into a superposed and registered relation to each other. More specifically, the upper substrate in the plate 11 is shifted in a perpendicular direction using a lifting device and maintained at a standby position. The plate 12 is shifted along the line L1 in the direction indicated by an arrow such that the lower substrate is brought to a position beneath the upper substrate. The upper substrate is then lowered toward the lower one and superposed thereon. In such a manner, two substrates can be superposed and laminated in registered with each other. The lifting device may be a suction device equipped with a suction head which is movable in the perpendicular direction. The power source for moving the suction head may be motorized or manual one. The suction of a substrate may be done by vacuuming or with a suction cup.

In the case of the plates shown in FIG. 2, the same shaped plates 11, 12 are placed on lines L1 and L2 offsetting from each other at a predetermined width indicated by "a", respectively whereby the two substrates are positioned such that they can be superposed with the predetermined offset width. More specifically, the plate 11 is shifted along the line L1 and the plate 2 is shifted along the line L2. In this case, the lamination operation may be done in the same manner described with respect to FIG. 1. The width "a" depends on a mirror to be produced but is usually from 0.5 to 3 mm. In such a manner, two substrates can be superposed and laminated with a predetermined offset width. The offset width is utilized advantageously to mount an electrode member on an mirror.

The following method may be employed to laminate two substrates consecutively and effectively using the above-described positioning method.

Figure 5:
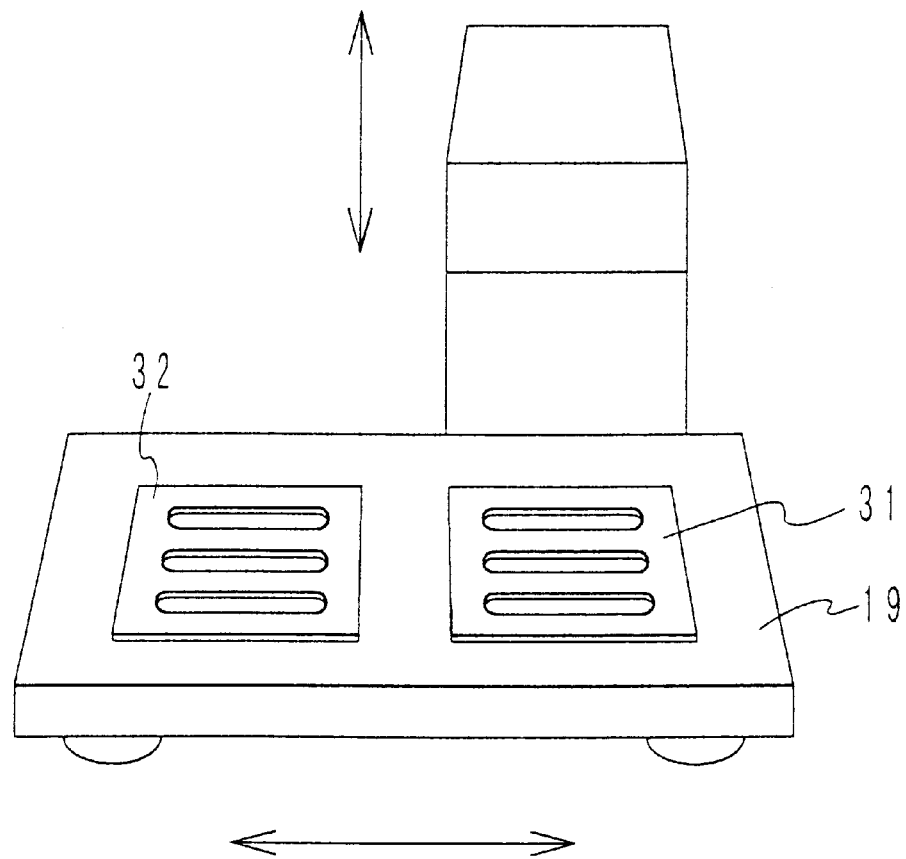
FIG. 5 is a schematic view showing a device which is capable of consecutively laminating two substrates.

FIG. 5 is a schematic view of a laminating device which can laminate two substrates consecutively.

A pair of plates 31, 32 are fixed on a slidable carrier. In this case, the plates are placed such that their linear portions are in coincide with a sliding direction of the carrier, whereby two substrates inserted into the plates are positioned such that they will be superposed in registered with each other or they will be superposed, offsetting from each other at a predetermined width. An upper substrate 31 is inserted into the punched-out portion of the plate 21. This substrate is lifted with a suction head and maintained at a predetermined height. A lower substrate already applied with a sealant is inserted into the punched-out portion of the plate 32. The carrier is then slid such that the lower substrate is located beneath the upper substrate. The upper substrate is lowered and superposed onto the lower substrate by releasing the suction, thereby laminating the two substrates. The consecutive lamination can be done by repeating these procedures. The power source of siding the carrier may be motorized or manual one. Alternatively, the consecutive lamination can be done by employing a conveyor-type carrier which is movable being reciprocally in a certain direction.

The following explanation is as to a method for superposing and laminating two substrates using a positioning device in accordance with another embodiment of the present invention.

Figure 6:
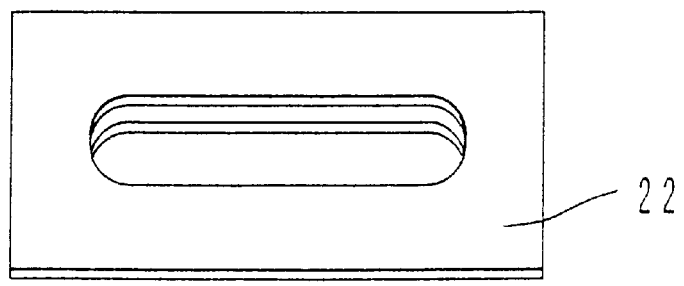
FIG. 6 is a schematic view showing a positioning device which laminates two substrates with a predetermined offset width.

FIG. 6 is a schematic view of a positioning device used to laminate two substrates, offset from each other at a predetermined width. There are two types of the positioning devices used in the present invention, one of which is a type of laminating two substrates at the same position and the other of which is a type of laminating two substrates, offset from each other at a predetermined width. Here, the lamination method using the latter device is described.

As shown in FIG. 6, the positioning device is comprised of a lower plate 41 provided with a punched-out portion 23 with a corresponding shape of a substrate and an upper plate 42 provided with a punched-out portion 25 with a size which is larger by a predetermined offset width than the punched-out portion 23, which the upper plate is superposed on the lower plate with at least one side 16 of the plate 41 registered with the side 17 of the plate 42. The plates 41, 42 may be made from the same material. The thickness of each of the plates is preferably the same as or slightly thicker than that of the substrate. Although not restricted, the shape of each of the plates is preferably rectangular because most of mirrors are rectangular and such shape is contributive to easy formation of the plate. The punched-out portion 23 of the lower plate 31 has the same shape as that of a substrate, but the punched-out portion 24 of the upper plate 42 is larger by a predetermined offset width than the punched-out portion 23. The shape of each of the punched-out portions varies, depending the shape of substrates. However, since the substrates having almost the same shape are generally used, the punched-out portion 24 shown in FIG. 6 has such a shape that at least one side thereof extends, offsetting from and parallel to the corresponding side of the punched-out portion 23 at a predetermined width "a" with two longer sides 16, 17 registered with each other. There may be used two plates which are joined together beforehand or which are detachable and joined together when used. There may be also used a device equipped with a plurality of such positioning devices thereby making it possible to produce cells consecutively.

The operation of superposing and laminating the two substrates using the above-described device is conducted as follows. Firstly, a lower substrate 23 applied with a sealant is inserted into the punched-out portion 23 of the lower plate 41 by dropping thereon. An upper substrate is then inserted into the punched-out portion 24 of the upper plate 42 with abutting the offset side 18. In such a manner, the two substrates can be superposed to each other and laminated with a predetermined offset width.

The two substrates can be firmly laminated by applying thereto some pressing force. The pressure to be applied to the substrates is preferably from $1 \times 10^{-4}$ to 0.5 MPa, more preferably from $1 \times 10^{-3}$ to 0.3 MPa, and particularly preferably from $5 \times 10^{-3}$ to 0.15 MPa.

By using a method according to the present invention, it is made possible to laminates two substrates with an accuracy of ±0.5 mm or less, preferably ±0.3 mm or less, and more preferably ±0.15 mm or less.

A sealant used in the present invention may be selected from epoxy-based sealants which have been widely used for the production of a liquid crystal display. The sealant may be thermally curing type or photo-curing type cured by the irradiation of ultraviolet or visible light.

Specific examples of such epoxy-based sealants are bisphenol A type epoxy resin, bisphenol F type epoxy resin, biphenyl type epoxy resin, bisphenol S type epoxy resin, diphenylether type epoxy resin, dicyclopentadiene type epoxy resin, bromine-containing bisphenol F type epoxy resin, fluorine-containing bisphenol A type epoxy resin, orthocresolnovolak type epoxy resin, DPP novolak type epoxy resin, trishydroxyphenylmethane type epoxy resin, tetraphenylolethane type epoxy resin, dicylopentadienephenol type epoxy resin, glycidylamine type epoxy resin, glycidyl ester type epoxy resin, alicyclic type epoxy resin, urethane-modified epoxy resin, and silicone-containing epoxy resin.

Specific examples of the thermally-curing sealant are ones cured only with an epoxy resin and ones cured with a curing agent to be added therein. Sealants of which the epoxy resin is cured is mixed with a catalytic curing agent. Specific examples of the catalytic curing agent are benzylsulfonium salt, benzylammonium salt, pyridinium salt, benzylphosphonium salt, hydrazinium salt, carboxylate, sulfonate, and amineimide. Specific examples of the curing agent to be mixed with a sealant are amine-based curing agents such as diethylenetriamine, triethylenetetramine, menthendiamine, isophoronediamine, methaxylenediamine, diaminodiphenylmethane, methaphenylenediamine, diaminodiphenylsulfone, and polyamideamine; acid anhydride curing agents such as methyltetrahydrophthalate anhydride, methylhexahydrophthalate anhydride, and methylnadic anhydride; and phenolic curing agents such as naphtol phenolic resin, dicyclopentadiene phenolic resin, and styrene phenolic resin. There may be used a latent thermally curing agent such as dicyandiamide, dihydrazide adipicate, imidazolic compounds, and an epoxy-amine adduct.

Specific examples of the photo-curing agent are the above-described epoxy resins, and epoxy-modified acrylic resins obtained by reacting the above-described epoxy resins with acrylic acid, methacrylic acid, crotonoic acid, hexylacrylic acid, or cinnamic acid. The photo-setting catalyst for the epoxy resins may be aryldiazonium salt, diaryliodinium salt, triarylsulfonium, β-ketosulfone, iminosulfonate, and benzoylsulfonate. The photo-setting catalyst for the epoxy-modified acrylic resins may be benzylmethylketal, α-hydroxyketone, and α-aminoketone.

The sealant may be mixed with beads. Beads act as spacers to keep the space, i.e., cell gap, between two conductive substrates, constant when they are laminated. The average particle size of such beads are usually from 200 to 20 $\mu$m, preferably from 150 to 30 $\mu$m, more preferably from 100 to 40 $\mu$m, and particularly preferably from 80 to 50 $\mu$m. No particular limitation is imposed on the materials for the beads as long as they have insulation properties. Therefore, there may be used (1) various glasses, such as quarts glass, soda-lime glass, borosilicate glass, and lead glass, or (2) various resins such as an acrylic-resin, a poly(propylene carbonate)-resin, and a vinylbenzene-resin. The beads may be colorless or colored and may be transparent or opaque.

When the sealant contains the beads, the content thereof is preferably from 0.01 to 10 percent by mass, more preferably from 0.05 to 5 percent by mass, and particularly preferably from 0.1 to 3 percent by mass. The sealant may contain fillers such as alumina and silica.

In the case where the beads are contained in the epoxy sealant, the viscosity thereof is preferably from 0.5 to 500 Pa.s, more preferably 2 to 300 Pa.s, and particularly preferably 5 to 150 Pa.s.

The sealant is usually applied on the prescribed place of the surface peripheral edge of the substrates. Needless to mention, the sealant may be applied on the surface peripheral edge of both of the substrates. In the case of using a substrate provided with a conductive layer, the sealant is applied on the surface peripheral edge of the conductive layer. The sealed portion may be provided with at least one opening through which an electrolyte or the like is injected.

In general, two conductive substrates having the same shape are used to produce an electrochromic mirror. In the case where two substrates are fittingly superposed on each other, the sealant is applied on the portion, 0.1 to 10 mm apart, from the edge of the substrate, along the shape thereof. Alternatively, in the case where two substrates are superposed so as to be offset from each other in a parallel direction, the position of the sealant to be applied is adjusted depending on the direction or position to be offset.

The sealant is applied by dispensing or screen-printing. Dispensing may be operated with a prior known device such those equipped with discharge nozzles, nozzle-fixed heads, sealant-containing barrels, a discharge adjuster, and a plate for setting substrates. Screen-printing may be operated with a prior known device equipped with a vacuum table, a frame-switching mechanism, a squeegee-switching mechanism, a squeegee-horizontal-shifting mechanism, a screen-printing plate, and a squeegee.

The lamination of the substrates is completed by curing the sealant. The sealant is cured under the conditions suitably selected depending on the types of substrates and sealants to be used. For example, the thermally curing sealant is heated at a temperature of usually 80 to 200° C., preferably 100 to 180° C. for one minute to 3 hours, preferably 10 minutes to 2 hours. When using the photo-curing sealant, eligible light sources are high voltage mercury lamps, fluorescent lamps and xenon lamps. Although not restricted, the irradiation dose is usually from 100 to 50,000 mJ/cm$^2$, preferably from 1,000 to 20,000 mJ/cm$^2$. Before one of the substrates is applied with the sealant and laminated on the other substrate, the sealant may be pre-cured by heating. The term "pre-cure" used herein denotes a state that the sealant is in the progress of curing, i.e., is not completely cured and fit to the substrate by being squashed when being superposed on the other substrate thereby exhibiting sufficient adhesivity. The cure of the sealant may be effected with the substrates pressed.

When the substrates are laminated, they are arranged in a parallel relationship to one another. Although not restricted, the width of the cell gap is usually from 20 to 200 $\mu$m, preferably 30 to 150 $\mu$m. The width of the cell gap can be easily adjusted by selecting the particle size of the beads contained in the sealant. Alternatively, any suitable shaped spacer may be placed on the peripheral edge of the substrate in order to adjust the width of the cell gap.

A cell for an electrochromic mirror can be manufactured by following the above-described procedures. An electrochromic mirror with a good durability can be produced using a cell comprised of substrates laminated with accuracy in accordance with the present invention.

Next, a method for producing an electrochromic mirror using a cell therefor or the present invention is described below.

No particular limitation is imposed on a method for producing an electrochromic mirror because various known methods can be employed. For instance, an electrochromic mirror can be easily produced by the following procedures. A liquid electrolyte containing an electrochromic compound if necessary is injected through an inlet into a cell and then the inlet is sealed. The resulting cell was connected to a power source and to a mirror case thereby obtaining an electrochromic mirror.

An all solid-state type electrochromic mirror can be easily produced by injecting a solid electrolyte precursor containing a liquid electrolyte and a polymerizable monomer, a solid electrolyte composition precursor further containing an electrochromic compound, a high polymer solid electrolyte precursor, or a high polymer solid electrolyte composition precursor further containing an electrochromic compound into a cell through an inlet and curing it before or after sealing the inlet so as to form an electrolyte, followed by connection to a power source and a mirror case.

The electrolyte may be selected from various know electrolytes which may be liquid, gelatinized and solid. Preferred are solid electrolytes. Eligible liquid electrolytes are ones dissolving a supporting electrolyte such as salts, acids, or alkalis in a solvent. No particular limitation is imposed on the solvent as long as it can dissolve the supporting electrolyte. Preferred are ones having a polarity. Specific examples of the solvent are water, and organic polar solvent such as acetic anhydride, methanol, ethanol, propylene carbonate, ethylene carbonate, dimethylsulfoxide, dimethoxyethane, acetnitrile, γ-butyrolactone, sulforan, 1,3-dioxane, N,N-dimethylformamide, 1,2-dimethoxyethane, and tetrahydrofuran. Preferred are propylene carbonate, ethylene carbonate, dimethylsulfoxide, dimethoxyethane, acetonitrile, γ-butyrolactone, sulforan, 1,3-dioxane, N,N-dimethylformamide, 1,2-dimethoxyethane, and tetrahydrofuran. These solvents may be used singlely or in combination.

No particular limitation is imposed on salts used as the supporting electrolyte, which may be inorganic ion salts such as alkali metal salts and alkaline earth metal salts, quaternary ammonium salts, and cyclic quaternary ammonium salts. Specific examples of such salts are alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaASF_6$, $KSCN$ and $KCl$; quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$, and mixtures thereof.

No particular limitation is imposed on acids as the supporting electrolyte. Any inorganic acids and organic acids may be used. Specific examples are sulfuric acid, hydrochloric acid, phosphoric acid, sulfonic acid, and carboxylic acid.

No particular limitation is imposed on alkalis as the supporting electrolyte as well. Sodium hydroxide, potassium hydroxide, and lithium hydroxide may be used.

Eligible gelatinized electrolytes are ones obtained by adding a polymer or a gelatinizer to the above-mentioned liquid electrolyte to be viscous or gelatinized. Although not restricted, the polymer may be polyacrylonitrile, carboxymethyl cellulose, polyvinyl chloride, polyethylene oxide, polyurethane, polyacrylate, polymethacrylate, polyamide, polyacrylicamide, cellulose, polyester, polypropylene oxide, and nafion. Eligible gelatinizers are oxyethylene methacrylate, oxyethylene acrylate, urethaneacrylate, acrylicamide and agar-agar. The gelatinized electrolyte may be sandwiched between two opposing conductive substrates by injecting a mixture of a monomer, which is a precursor of the polymer, and a precursor of the gelatinizer into a cell formed by laminating two conductive substrates and then polymerizing or gelatinizing the mixture.

No particular limitation is imposed on the solid electrolytes as long as they are solid at room temperature and have ion conductivity. Specific examples of the solid electrolyte are polyethylene oxide, a polymer of oxyethylenemethacrylate, nafion, polystyrene sulfonate. Particularly preferred are polymeric solid electrolyte obtained by polymerizing a precursor containing an oxyalkylene(metha)acrylate-based compound or a urethane acrylate-based compound as a main component. The solid electrolyte may be ones obtained by solidifying a precursor which is a compound containing a monofunctional acryloyl-modified polyalkylene oxide and/or a polyfunctional acryloyl-modified polyalkylene oxide, the above-mentioned organic solvent, and the above-mentioned supporting electrolyte.

No particular limitation is thus imposed on the electrochromic compound as long as it colors, decolors, and discolors by electrochemical oxidation or reduction reaction. Specific examples of the electrochromic compound are $Mo_2O_3$, $Ir_2O$, $NiO$, $V_2O_5$, $WO_3$, viologen, polytionphene, polyaniline, polypyrrole, metal phthalocyanine, pyrazoline, phenylenediamine, phenazine, phenoxazine, phenothiazine, tetrathiafulvalene, ferrocene, and derivatives thereof.

In a method for producing a cell for an electrochromic mirror according to the present invention, two conductive substrates can be laminated with accuracy in terms of position. Particularly, even when using substrates having four corners with complex curved contour, these substrates can be laminated with high accuracy. The present invention makes it possible to produce an electrochromic mirror with excellent durability in an effective manner at low cost.

Examples of the invention will now be provided, with understanding that the invention is in no way limited by these examples.

EXAMPLE 1

There were prepared two stainless-plates each provided with a punched-out portion having a shape corresponding to a rectangular substrates of 30 cm length and 7 cm width having four corners formed into complex curved contours. The two plates were placed and fixed on a slidable carrier such that oneof the substrates is offset 2 mm to the transverse direction of the punched-out portion, from the other substrate as shown in FIG. 2.

A transparent conductive substrate with no sealant was inserted into the punched-out portion of one of the plates and shifted to the position below a suction head equipped with a lifting mechanism. The suction head was lowered onto the substrate and held it by vacuum-suction. The suction head was then lifted and maintained at the position. A reflective conductive substrate was applied on the peripheral edge with a mixture of 20 g of a commercially available thermally curing epoxy-based sealant (STRACTOBOND XN-21-S) well-kneaded with 0.4 g of blue plate beads having an average particle size of from 53 to 63 μm, in 1.5 mm width. The substrates was then inserted into the punched-out portion of the other plate with the sealant-applied surface faced upward. This plate was slid to the position below the suction head. The suction head was lowered onto the plate and the substrate held thereby was released so as to be superposed on the sealant-applied substrate. The two substrates were laminated by applying thereto a pressure of $5\times10^{-3}$ Mpa and curing the sealant thereby obtaining a cell for an electrochromic mirror. The accuracy in position of the laminated substrate was ±0.15 mm or less.

EXAMPLE 2

An electrochromic mirror cell was produced by following the procedures of Example 1 except that two plates each provided with 3 punched-out portions were used. The positioning accuracy of the laminated substrates was ±0.20 mm or less.

EXAMPLE 3

There was prepared a plate provided with a punched-out portion having a shape corresponding to a rectangular substrates of 30 cm length and 7.0 cm width having four corners formed into complex curved contours. There was also prepared a plate provided with a punched-out portion having a shape corresponding to a rectangular substrate of 30 cm length and 7.2 cm width having four corners formed into complex curved contours. This plate was superposed on the former substrate and placed altogether on the flat surface of a carrier whereupon the plates were superposed such that one of longer sides of the plate was in registered with that of the other substrate thereby obtaining a positioning device as shown in FIG. 6. A transparent conductive substrate was applied on the peripheral edge with a mixture of 20 g of a commercially available thermally curing epoxy-based sealant (STRACTOBOND XN-21-S) well-kneaded with 0.4 g of blue plate beads having an average particle size of from 53 to 63 μm, in 1.5 mm width. The transparent substrate was then inserted into the punched-out portion of the lower plate. A reflective conductive substrate was inserted into the upper punched-out portion with abutting the other side thereof offsetting from the corresponding side of the lower punched-out portion. The two substrates were laminated by applying thereto a pressure of $2 \times 10^{-3}$ Mpa and curing the sealant thereby obtaining a cell for an electrochromic mirror. The positioning accuracy of the laminated substrate was ±0.3 mm or less.

EXAMPLE 4

The procedures of Example 1 was followed thereby obtaining an electrochromic mirror cell with an inlet. Separately from this, a homogeneous solution of a polymeric solid electrolyte composition precursor containing an electrochromic compound was prepared by adding lithium perchlorate, dibutylviologen perchlorate and ferrocene to a mixed solution of 1.0 g of methoxypolyethylene glycol monomethacrylate manufactured by SHIN-NAKAMURA CHEMICAL CO., LTD. under the trade name of "M40GN", 0.02 g of polyethylene glycol dimethacrylate manufactured by SHIN-NAKAMURA CHEMICAL CO., LTD. under the trade name of "9G", 4.0 g of γ-butylolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid such that the concentration of lithium perchlorate, dibutylviologen perchlorate and ferrocene is made 0.8 M, 30 mM, and 30 mM, respectively. The resulting solution was injected into the above cell through the inlet, followed by sealing the inlet. The polymeric solid electrolyte composition precursor was photo-cured. The cell was then connected to a lead wire and a control circuit and accommodated into a mirror case thereby obtaining an electrochromic anti-glare mirror.

What is claimed is:

1. A method for producing a cell for an electrochromic mirror by laminating two electrically conductive substrates which comprises:

a step of placing at least two plates each having at least one linear portion and provided in a predetermined position with a punched-out portion having a shape corresponding to that of said substrate, in a juxtaposed relationship to each other at a predetermined interval, such that said linear portions are registered with the same line or two lines offset from each other, respectively;

a step of inserting said two substrates into each of said punched-out portions;

a step of shifting one of said plates holding the substrate therein over the other plate so as to locate said substrates in a superposed relationship to each other; and a step of laminating said substrates.

2. The method according to claim 1 wherein at least two said plates are arranged on a slidable carrier.

3. The method according to claim 1 wherein said plates each have a rectangular shape.

4. The method according to claim 1 wherein a plurality of said punched-out portions are provided in said plate.

5. A method for producing a cell for an electrochromic mirror by laminating two electrically conductive substrates which comprises:

a step of inserting one of said substrates into the punched-out portion having a shape corresponding thereto of a lower plate of a positioning device which further comprises an upper plate provided with a punched-out portion having the same shape as that of the punched-out portion of the lower plate, arranged in a superposed relationship to the lower plate so as to register said punched-out portions with each other or an upper plate provided with a punched-out portion which is larger by a predetermined offsetting width than said lower punched-out portion, arranged in a superposed relationship to the lower plate so as to register at least one side of one of the punched-out portions with that of the other plate; and a step of inserting the other substrate into the punched-out portion of the upper plate so as to be superposed on said lower substrates or a step of inserting the other substrate into the punched-out portion of the upper plate with one side of the other substrate abutting the offset side of the upper punched-out portion so as to be superposed on the lower substrate, offsetting therefrom at a predetermined width.

6. The method according to claim 1 wherein said two substrates have the same shape.

7. The method according claim 1 wherein each of said two substrates has a rectangular shape.

8. An electrochromic mirror wherein it is obtained by injecting an electrolyte in the cell produced by a method according to claim 1.

* * * * *